United States Patent [19]

Stenkvist

[11] 3,999,000
[45] Dec. 21, 1976

[54] SELF-COMMUTATING DC ARC FURNACE HAVING STARTING ELECTRODE AND METHOD OF ITS OPERATION

[75] Inventor: Sven-Einar Stenkvist, Vasteras, Sweden

[73] Assignee: Allmanna Svenska Elektriska Aktiebolaget, Vasteras, Sweden

[22] Filed: June 19, 1975

[21] Appl. No.: 588,180

[30] Foreign Application Priority Data

June 24, 1974 Sweden ............................ 7408235

[52] U.S. Cl. ..................................... 13/9 R; 13/34
[51] Int. Cl.² ......................................... H05B 7/144
[58] Field of Search ................ 13/34, 18, 12, 13, 9; 314/34

[56] References Cited
UNITED STATES PATENTS 1,244,415  10/1917  Booth ................................. 13/18 X

*Primary Examiner*—R. N. Envall, Jr
*Attorney, Agent, or Firm*—Kenyon & Kenyon Reilly Carr & Chapin

[57] ABSTRACT

A DC arc furnace of the type having an arcing electrode and a withdrawable starting electrode for initially forming electrical contact with a charge of metal pieces, and an electric connection for a subsequently formed melt in the furnace, has a DC power source positively connected directly with the starting electrode and the melt connection, and negatively connected with the arcing electrode. When initially charged with solid metal pieces, the starting electrode is contacted with the charge so that an arc is formed between the pieces and the arcing electrode until a melt is formed for contact with the connection for the melt. With both the starting electrode and melt connection directly connected positively with the power source, without intervening control equipment, the current automatically commutates from the starting electrode to the melt connection as the melt forms so as to contact the latter. Thereafter the starting electrode is withdrawn from contact with either the remaining solid pieces or the melt, as the case may be.

4 Claims, 1 Drawing Figure

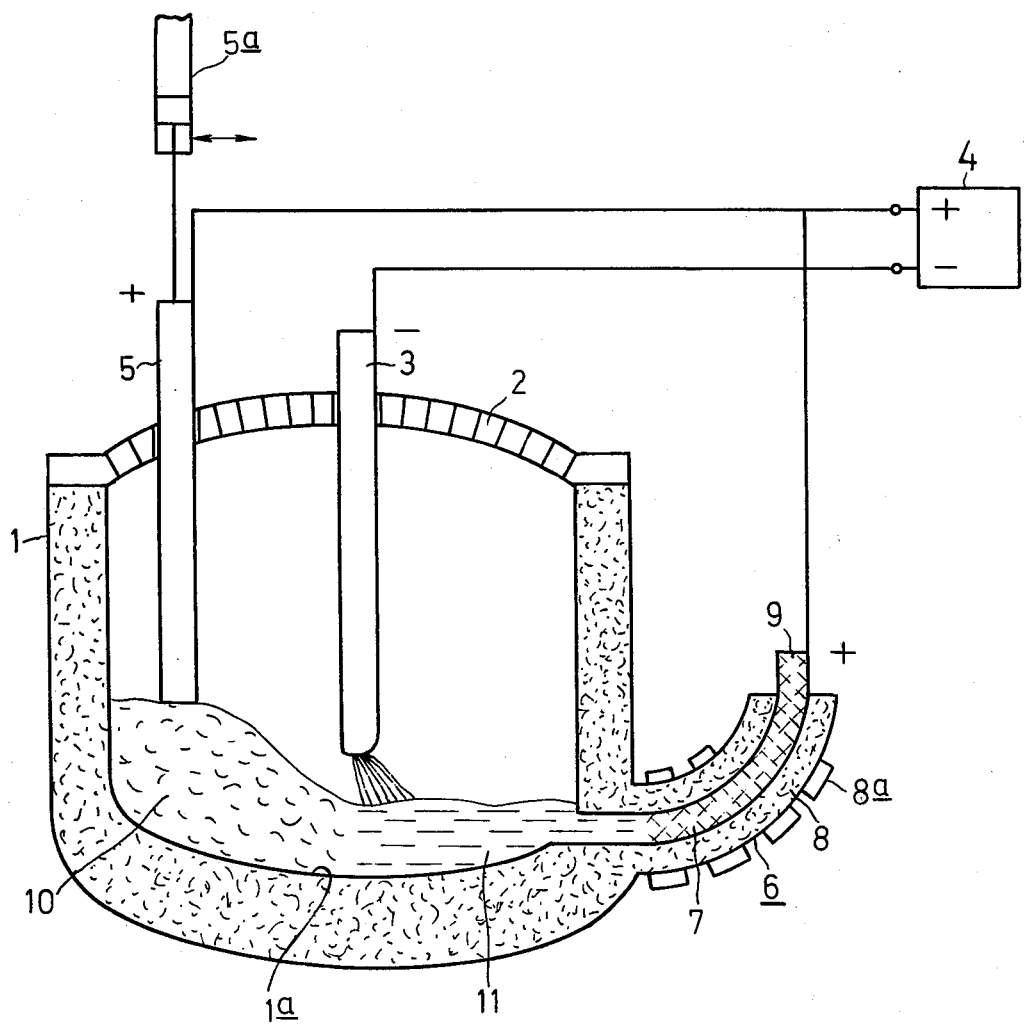

SELF-COMMUTATING DC ARC FURNACE HAVING STARTING ELECTRODE AND METHOD OF ITS OPERATION

BACKGROUND OF THE INVENTION

DC electric arc furnaces are shown to the prior art as having an arcing electrode, of the graphite type, an electric connection for a melt in the furnace which does not become fully effective in the absence of a melt, and a withdrawable starting electrode for contact with metal pieces initially charged in the furnace, such as steel scrap.

In operation, the starting electrode is connected with, for example, the positive side of a power source with the arcing electrode connected with the negative side, the starting electrode being pressed into the scrap, the latter electrode normally being positioned so it can be moved up and down. In this way, the solid pieces are melted to form a melt in the furnace which, with time, comes into effective contact with the electric connection for such a melt and which is normally in the bottom of the furnace's hearth. After the melt is thus formed to that degree, the circuit including the starting electrode is switched off, and the circuit to the melt connection is switched on so that the arcing electrode can then carry out the metallurgical operation involved. When it is no longer needed, the starting electrode is withdrawn partially or completely from the furnace because it often is a metal electrode unable to withstand the heat of continued metallurgical operation.

The above has a substantial disadvantage because the high power of the electric currents required during the initial melt-down phase by the starting electrode's operation, and thereafter for powering through the hearth connection which continues in operation, require switches of very high current-carrying capacity even in the case of relatively small furnaces. In the case of furnaces having larger capacities than are usual for the described type of furnace, it becomes substantially impossible, either technically or economically, to provide switches of adequate current carrying capacity.

The object of the present invention is to provide for the operation of a furnace of the above-described general type, when because of larger capacities, for example, higher powered currents are involved than have heretofore been considered practicable.

SUMMARY OF THE INVENTION

According to the present invention, the above object is achieved by connecting both the starting electrode and the melt connection directly and, therefore, with the same polarity to the DC power source for the furnace, with the arcing electrode connected to the source and with the opposite polarity. Preferably, the arcing electrode is made negative because of the better operating and service life characteristics involved, the starting electrode and the melt connection then both forming anodes directly connected to the power source. No switches are involved in any way.

The above is in accordance with the new method as well as the invention's furnace phase per se.

According to the method, the operation would be substantially as in the prior art manner, the starting electrode being lowered into contact with a charge of scrap in the furnace and thus making the scrap an anode with a cathodic arcing electrode, normally a conventional graphite or graphite-type electrode, forming an arc with the scrap where it remains free from the starting electrode, the starting electrode and arcing electrode being safely offset from each other to avoid interarcing. In this way the scrap is formed into a melt adequate to bring what may be the usual melt connection effectively into the circuit.

Now, the difference between the present invention and the prior art is that, without switching of any kind, the power from the source is simply permitted to automatically commutate from the starting electrode through the remaining under-melted metal pieces and the melt now establishing a good connection with the melt connection, to the melt connection. Because the molten metal can form a possibly even better electrical contact with the melt connection, the majority of the current now shifts automatically to the melt connection, releaving the starting electrode from all or much of the electrical load it initially carries. This permits the starting electrode to be withdrawn with the current now being carried entirely between the melt connection, the melt and the usual arcing electrode, all without the use of switches such as have been formerly thought necessary.

In a DC furnace, the melt connection may be formed in various ways, such as by using an electrically conductive hearth or, more preferably, by an electrical conductor extending from outside the furnace and its hearth to an inner conductor end exposed to the melt in the furnace's hearth. In the latter instance, the problem of shifting the current from the starting electrode to the melt connection is particularly involved, particularly when the hearth connection is formed by a connector in a novel arrangement wherein the inner end of the conductor is permitted to become molten from the heat of the melt and on its way away from the melt in the hearth via a suitable refractory enclosure is cooled so that the melt heat is removed at a rate causing the connector, which may be a bar of steel in the case of a steel furnace, to solidify and cool to a substantial extent, permitting its outer end to be easily connected in the furnace circuit.

BRIEF DESCRIPTION OF THE DRAWINGS

The accompanying drawing schematically in vertical section shows a DC electric arc furnace of the general type previously described and having the referred to type of melt connection.

DETAILED DESCRIPTION OF THE INVENTION

The illustrated furnace may follow the prior art construction to the extent that it comprises a vessel 1 having a bottom forming a hearth 1a and provided with a roof 2 down through which an arcing electrode 3 extends and which is negatively powered by a DC power source 4 having a positive connection with a starting electrode 5 which also extends down through the roof 2 and which is withdrawable upwardly by means here exemplified by a hydraulic lifting device 5a. The starting electrode is connected to the positive side of the power source 4.

A hearth connection 6 is also connected to the positive side of the source 4, this connection being of a recent design comprising an elongated connector 7 encased by a refractory enclosure 8, the connector having an inner end exposed to the hearth 1a and an outer end 9 which is externally exposed and is connected to the positive side of the source 4.

It can be seen that both the hearth connection 6 and the starting electrode 7 form anodes with the arcing electrode 3 forming a cathode. The starting electrode 5 may be made of metal and the arcing electrode 3 may be made of graphite. Although of recent design, which is in the course of being patented, the hearth connection 6 may be considered as prior art insofar as the present invention is concerned. A DC power source 4 should provide current at a voltage and amperage suitable for operation of the arcing electrode 3. It is to be understood that as a matter of course a plurality of the arcing electrodes 3, starting electrodes 5 and connections 6 can be used when desired.

It is to be noted that no electrical switches are used in any way. The anodes 5 and 9 are directly connected to the power source 4, as is the arcing electrode cathode 3.

Therefore, there is no limitation on the size of the furnace of its electric power requirement.

The new method comprises such direct electric powering of all of the electrodes, paying attention to the polarities referred to above. To start the furnace, solid metal pieces 10, such as steel scrap, are piled on the hearth 1a under the starting electrode 5, which is withdrawn at that time, to form a localized pile of substantial height. The connector 7 is at that time a solid metal bar of the same composition as the melt to be formed, the connector being a steel bar, when steel scrap is to be melted, for example. However, at the start the inner end of the connector 7 is either free from the scrap or metal pieces or, at least, unable to form adequate contact therewith to carry the current required by the arcing electrode 3.

Incidentally, the metal pieces can be charged in the usual way, the furnace roof 2 of electric arc furnaces in general, being removable for charging of the furnace.

With the pile 10 in place in the furnace and the roof 2 applied, the furnace is started by lowering the starting electrode 5 so it presses on and forms firm electrical contact with the top of the pile 10. Then in the usual way the arcing electrode 3 is lowered to contact the portion of the pile 10 which inherently spills over from the pile and under the arcing electrode 3, this electrode then being raised so that the arcing starts. Thereafter, mainly via the arc but to some extent by the electric resistance heating involved by the passage of the current between the starting electrode 5 and the arc, melting of the metal pieces or scrap proceeds. In time, the melt 11 forms so as to contact the inner end of the connector 7 of the hearth connection 6. It is at this time that heretofore the electric switches have been required to switch over the positive side of the source 4 from the starting electrode 5 to the hearth connection 6, it being understood that other hearth connections might be used, providing they are capable of carrying the electric power involved by a furnace of large capacity.

With the present invention, the switches are eliminated, the current gradually, or possibly quickly, commutating from the starting electrode 5 to the hearth connection 6. Surprisingly, the shift-over thus automatically achieved, occurs smoothly and without excessive power surges. After this automatic commutation or switch-over, the starting electrode 5 can be withdrawn and, if desired, completely free from the heat within the furnace. Although not shown, the withdrawal of the starting electrode 5 can be automated for actuation, as by using the drop in the current through the starting electrode which inherently results when the hearth connection 6 becomes effective to carry the arcing current.

As the initially formed melt 11 heats the inner or contacted end of the connector 7, the connector melts, but because the connection 6 includes external water cooling 8a for the refractory enclosure 8 of the connector 7, this melting does not extend to the outer end 9 connected to the power source.

Because the present invention is of particular usefulness in connection with large furnaces drawing too much electric power to permit the use of the heretofore usual switches, it is again emphasized that the arcing and starting electrodes, and the hearth connection 6, may be used in multiple as required to carry the power involved.

After the initial melt-down of the scrap and with the starting electrode 5 either withdrawn or at least not in use if not withdrawn, further furnace operation may be conventional.

What is claimed is:

1. A DC electric arc furnace comprising a hearth having an electrical connection for a melt in the hearth and which has an inner surface directly exposed inside of the hearth and which is electrically conductive at all times, at least one arcing electrode positioned for arcing with metal in the hearth, at least one starting electrode having means for moving it into contact with a charge of solid pieces in the hearth and for withdrawing the starting electrode from that charge after the charge becomes a melt for said connection, a DC power source for the furnace, and means for placing said electrode and said connection in an electric circuit with said source with both said connection and starting electrode directly connected together therewith with the same polarity and the arcing electrode connected to have an opposite polarity, so that said source is mainly connected through the starting electrode initially when starting the furnace with said charge and with formation of a melt therefrom automatically commutates to said connection with said arcing electrode continuously arcing via initially the solid pieces and subsequently to the melt.

2. The furnace of claim 1 in which said electrical connection is formed by a metal bar extending through said hearth.

3. The furnace of claim 2 in which said bar and said starting electrode are respectively positioned adjacent to opposite sides of said hearth.

4. A method for starting a DC arc furnace having a hearth, at least one melt connection having an inner surface directly exposed inside of said hearth and which is electrically conductive at all times, at least one arcing electrode, and at least one removable starting electrode; said method comprising forming a charge of solid metal pieces on the hearth, electrically interconnecting the starting electrode and the melt connection and applying DC arcing power negatively to the arcing electrode and positively to the interconnected starting electrode and hearth connection while causing the starting electrode to contact said charge and the arcing electrode to form an arc with said charge so that some of said pieces form a melt initially contacting the directly exposed inner surface of the melt connection, and thereafter allowing the arcing power to automatically commutate through remaining under-melted pieces of the charge while the melt increases to a volume permitting the melt connection to carry at least a majority of said power, and thereafter removing the starting electrode from contact with any remaining under-melted pieces of the charge and the melt formed from the charge.

* * * * *